US008699073B2

United States Patent
Natarajan

(10) Patent No.: US 8,699,073 B2
(45) Date of Patent: Apr. 15, 2014

(54) CLOUD AND HTML BASED FAX AND DOCUMENT MANAGEMENT SYSTEM

(76) Inventor: Sundaram Natarajan, Fremont, CA (US)

( * ) Notice: Subject to any disclaimer, the term of this patent is extended or adjusted under 35 U.S.C. 154(b) by 182 days.

(21) Appl. No.: 13/441,781

(22) Filed: Apr. 6, 2012

(65) Prior Publication Data

US 2012/0257249 A1    Oct. 11, 2012

Related U.S. Application Data

(60) Provisional application No. 61/473,680, filed on Apr. 8, 2011.

(51) Int. Cl.
*G06F 3/12* (2006.01)
*G06K 15/00* (2006.01)

(52) U.S. Cl.
USPC ........................................ 358/1.15; 358/1.18

(58) Field of Classification Search
CPC ................. G06K 9/00671; G06F 17/30896; G06F 17/30905; G06F 21/128; G06F 17/309; G06F 3/1246; H04L 12/5835; H04N 21/4355
USPC .............. 358/1.1, 1.9, 1.13, 1.14, 1.15, 1.18; 707/E17.121, E17.118; 715/230, 232, 715/233, 234, 239, 760; 717/608
See application file for complete search history.

(56) References Cited

U.S. PATENT DOCUMENTS

| 2004/0163042 | A1* | 8/2004 | Altman ......................... 715/512 |
| 2005/0198202 | A1* | 9/2005 | Yamamoto .................... 709/218 |
| 2010/0114995 | A1* | 5/2010 | Kopp et al. ................... 707/811 |
| 2010/0281351 | A1* | 11/2010 | Mohammed .................. 715/205 |
| 2011/0167331 | A1* | 7/2011 | Altman ......................... 715/233 |
| 2011/0314371 | A1* | 12/2011 | Peterson et al. .............. 715/234 |

* cited by examiner

*Primary Examiner* — Gabriel Garcia
(74) *Attorney, Agent, or Firm* — Stephen E. Zweig

(57) ABSTRACT

A web-browser/web server method of signing documents, in particular faxes and email attachments. Documents are sent to the web server, often by analog or electronic fax reception, email attachment, or upload. At the web server, the images of the documents are converted to an image layer, and are signed, manipulated, and otherwise altered by combining the image layer with annotation layers constructed from instructions and data that are uploaded by the user from a web browser running on a remote computerized device. The system and method manipulates the documents using HTML5 based image manipulation features such as the <canvas> element. Using this method, users may view, sign, annotate, and otherwise manipulate documents from their web browsers as if the documents were residing on their local machine. Users may then instruct the remote server to transmit to the intended destination by analog or electronic fax, email attachment, download, or other means.

12 Claims, 22 Drawing Sheets

Figure 22

CLOUD AND HTML BASED FAX AND DOCUMENT MANAGEMENT SYSTEM

This application claims the priority benefit of U.S. provisional application 61/473,680, "CLOUD AND HTML BASED FAX AND DOCUMENT MANAGEMENT SYSTEM", inventor Sundaram Natarajan, filed Apr. 8, 2011; the contents of which are incorporated herein by reference.

BACKGROUND OF THE INVENTION

1. Field of the Invention

This invention is in the field of faxing and electronic document management technology.

2. Description of the Related Art

Many business functions in modern life are based upon transactions in which an individual receives paper forms, often by fax or by downloading from the Internet, prints out the forms, fills in a few items, signs the form, and then either faxes the form somewhere else, or else scans the form and emails the form somewhere else.

For example, Doctor's offices are constantly inundated with insurance forms, patient forms, and prescription refill request forms. These forms are often handled by fax over telephone lines, and thus the physician's staff often spends a considerable amount of time shuffling paper from fax machines, to the doctor, and back to other fax machines as a result. In addition to expense and inefficiency, this paper shuffling can also lead to errors as individual papers can often become lost, mishandled, and/or faxed to the wrong destination.

In the same way, contracts and government forms, for example tax forms, are also constantly being received, first in electronic form as email attachments, scans, faxes, downloads and the like. They are then briefly converted to paper for the purposes of the signature, and then converted back to electronic form for subsequent emailing as attachments, faxes, uploads, and the like. The resulting process is again quite time consuming and inefficient.

Various types of prior art document management systems have been proposed, exemplified by U.S. Pat. Nos. 6,411,685; 6,859,909; 7,164,488; 7,317,697; 7,339,707, and U.S. application Ser. Nos. 09/922,745; 09/939,440; and 10/476,833; they have suffered from various drawbacks. In addition to being either cumbersome to use, tied to proprietary technology, or simply not appropriately designed to adequately streamline the electronic to paper to electronic signature process, none have adequately met user needs.

Although the Adobe Acrobat family of products, produced by Adobe Systems, Inc., San Jose Calif. have had some success with various proprietary solutions to manage PDF documents, these proprietary solutions tend to consume much computer system resources, and also tend to lack flexibility and are restricted to fillable or structured PDF documents Thus the present unsatisfactory state of affairs of electronic to paper back to electronic conversions continues to be the standard method of conducting business. Further improvements in this area are thus desirable.

BRIEF SUMMARY OF THE INVENTION

Ideally what is needed is a simple, lightweight (e.g. minimal burden to the user or the user's equipment), and very low cost method to allow users to streamline the present cumbersome system of "electronic to paper to electronic" document signing and annotation.

The present invention is for a web (cloud) based document management system that allows users, equipped with standard computerized devices and web browsers, to create virtual paper copies of relevant faxes and other documents on remote servers, sign or otherwise annotate these virtual copies, and then transmit the final signed or annotated results to the user's designated recipient, all without ever having to handle paper or sign paper copies of documents.

The system takes advantage of recent advances in HTML functionality, such as the <canvas> element recently introduced in HTML5 and/or (other alternative HTML image manipulation element(s)) to manipulate high quality images of faxes and documents on remote web servers, while also showing high quality images of the resulting annotated documents on the user's local web browser. This allows the user to conveniently manipulate a virtual electronic copy of the document with the same ease and speed as a paper copy of the document, but without the hassles of having to print to paper, handle paper, and scan paper.

In one embodiment, the invention may be a web-browser/web server based method of signing documents, in particular faxes and email attachments. Documents are uploaded to the invention's web server (here called a signature web server); often by analog or electronic fax reception, email attachment, or upload. At the signature web server, the documents are converted to an image layer, and are signed, manipulated, and otherwise altered by combining the resulting document image layer with various annotation layers. These annotation layers are created by the user (signer) and reside on the annotation server, but are created from commands coming from the user's web browser.

In a preferred embodiment, the system and method manipulates the documents using HTML5 based image manipulation features such as the <canvas> element, or equivalent HTML based image elements. Using this method, users may view, sign, annotate, and otherwise manipulate documents from their web browsers as if the documents were residing on their local machine. Users may create signed and otherwise annotated documents, and then instruct the remote signature web server to transmit the annotated or signed document to the user's desired destination by essentially any and all transmission methods. Thus the final annotated document can be transmitted by analog or electronic fax methods, email attachment, direct web service connection, download, or even transmitted by a physically mailed hard copy if desired.

BRIEF DESCRIPTION OF THE DRAWINGS

FIG. 10 shows the user in the process of moving a previously uploaded signature image into the correct portion of the previously uploaded IRS tax form.

FIG. 11 shows the user signature in the correct place in the IRS tax form. Additionally, the user has annotated the IRS tax form with a date as well.

FIG. 22 is another view of the tablet interface, showing the final signed and dated document.

DETAILED DESCRIPTION OF THE INVENTION

Nomenclature: Here documents that exist in an electronic form for at least part of their life cycle are often referred to in the alternative in this document as "faxes" even though the document may not have actually been transmitted by an old style type analog fax transmission. Thus, for example, a document in PDF form that may be transmitted by an email attachment will often be referred to in the alternative as a "fax".

As previously discussed, the prior art method of handling and signing documents, such as faxes, was unsatisfactory due to the need to create what were often only temporary paper copies of the documents, simply for purposes of capturing a signature or other type of annotation.

Figure 1:
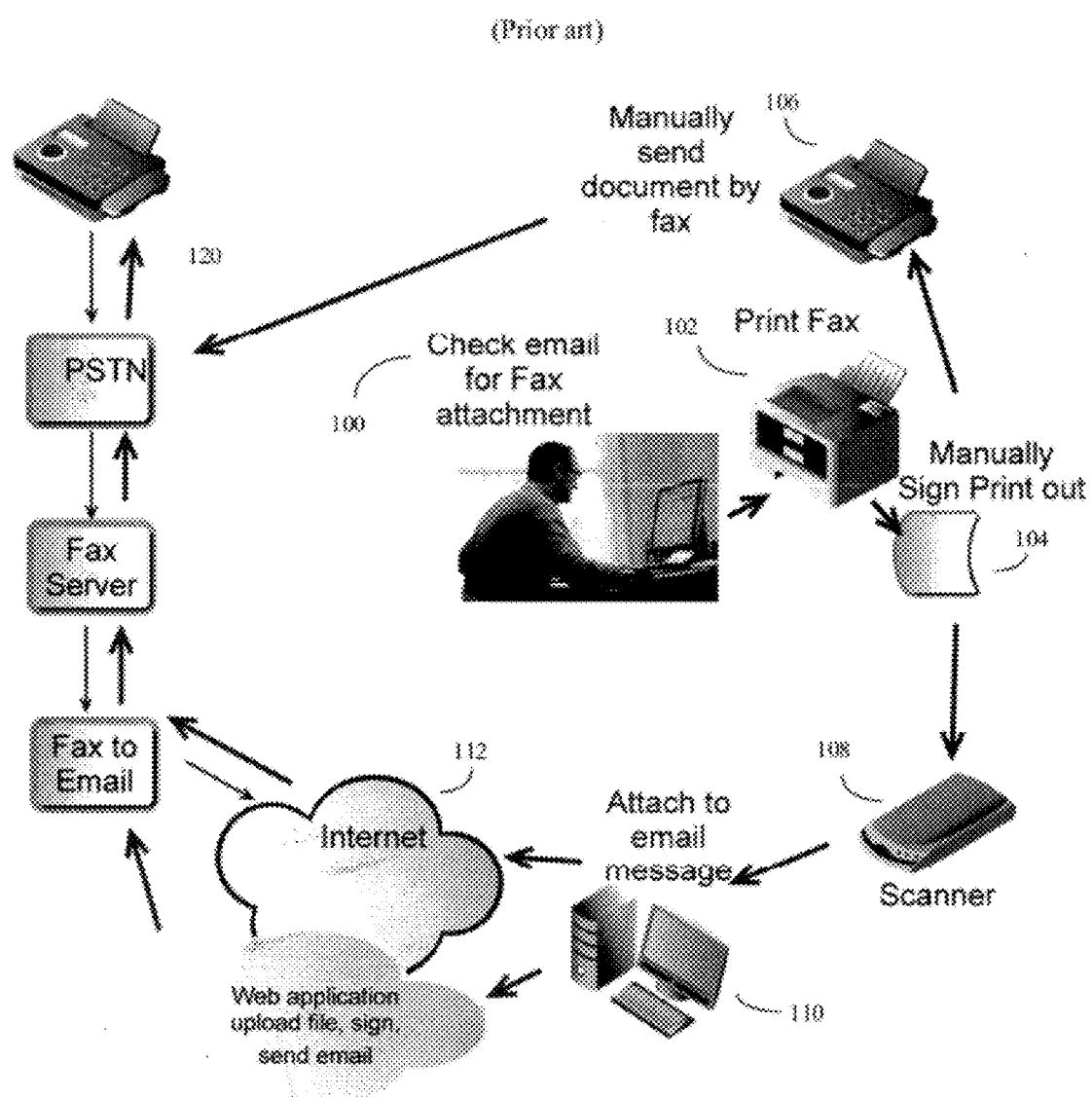
FIG. 1 shows an overview of prior art methods of signing faxes and documents. The documents needed to be printed out, signed, and then scanned or faxed to their recipients.

FIG. 1 shows an example of this type of prior art method. This prior art system grew out of a not completely satisfactory merging of earlier analog transmission fax methods, which sent copies of documents by analog signals over telephone lines and the like, with Internet email technology. As the use of email and email attachments expanded in popularity, often documents, such as contracts, agreements, or order forms, are first received by the user in the form of email attachments (100). The user would then print these out, creating a paper copy (102). The user would then manually sign the paper copy (104), and then either use an analog fax (106) to send the signed paper copy to the destination (120), or else scan the paper copy (108), producing an electronic file such as a PDF copy of the paper document. The user would then attach this PDF file to an email message (110), and transmit a PDF copy of the signed document over the internet (112) to various fax-to-email, fax servers, and other intermediaries, to the user's desired recipient or destination.

By contrast, the invention streamlines this inefficient process. In particular, the invention eliminates the necessity of having to produce an intermediate paper copy of the document for signing and annotation purposes.

Figure 2:
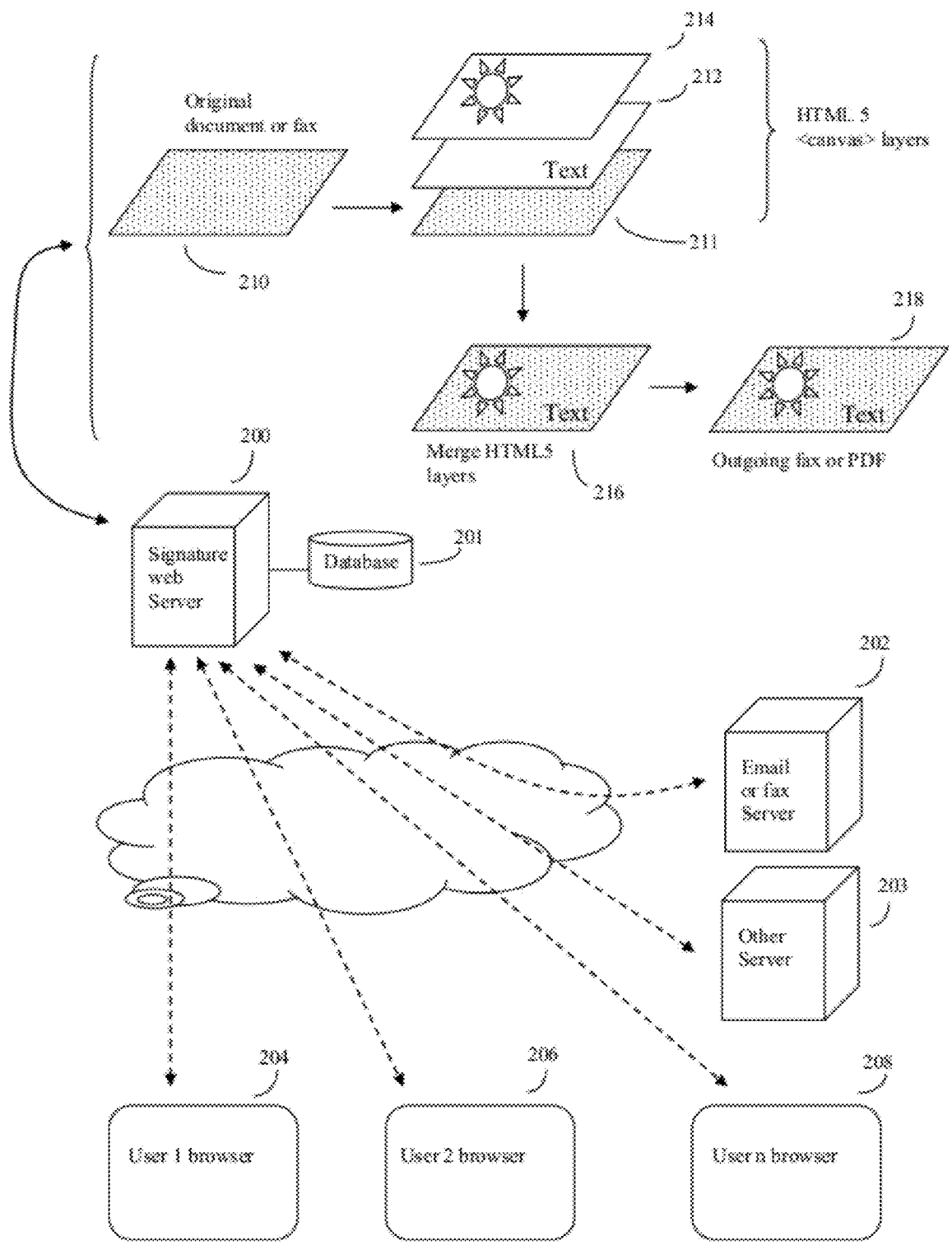
FIG. 2 shows an overview of the invention's Internet server (cloud) and HTML (HTML-5) based fax and document signing and management system, here shown interacting with various users running browser equipped computerized devices over the Internet.

FIG. 2 shows a drawing illustrating some embodiments of the inventions methods.

In one embodiment, the invention may be a method of annotating a web server stored document images using a web browser. Because often these annotations will be user signatures, this web server will be referred to in this specification as a "signature web server" (200) to help designate this commonly used function, and to distinguish the invention's web server from other web servers. It should be understood, of course, that in fact the invention's signature web server will in fact generally be capable of many other functions as well.

This method may, for example, work by first loading the document images onto the signature web server. These document images may come from many different sources. In some embodiments, the signature web server (200) can be either equipped with the analog circuitry necessary to receive and transmit standard analog fax transmissions, or else be in communication with other servers, devices, or services (e.g. eFax) equipped to receive standard analog fax transmissions. In other embodiments the signature web server may receive emails that contain attached documents, such as PDF attachments, by either standard email methods (e.g. POP or IMAP connections to email servers) (202) or by use of various email service (e.g. Gmail) Application Programming Interface (API) methods or by accessing documents through web services from other web servers. In other cases the document images may be directly uploaded to the signature web server (200) directly from the web browsers of various users running various computerized devices such as desktop computers, laptop computers, tablets, and smartphones (204), (206), (208). Some documents may also be stored on the signature web server's database (201). Other documents may be uploaded from third party web servers (203).

The signature web server may convert the documents to various electronic image formats as appropriate, and generally will operate on the document images using a virtual software image layer based strategy. In order to facilitate communication and synchronization with the various users running web browsers on various computerized devices (204), (206), (208), often it will be convenient to manipulate the document images on the signature web server using various HTML image functions. In a preferred embodiment, the invention may utilize the HTML5 <canvas> element, or other HTML based image manipulating elements.

Here for example, at the signature web server (200), the original document may be converted to a first document image layer (210). Thus, for example, the signature web server (200) may send an HTML version of the first document image layer (210) to user 1 (204), who may thus view this original document in his or her local web browser. (Alternatively this first HTML version may be produced by combining the first document image layer with empty or blank annotation layers). The signature web server will also send various web browser based image manipulation tools to user 1 (204) as well. User 1 can then use these web browser based image manipulation tools to annotate his or her image of the document (210) on his or her web browser (204). The web browser (204) will send the various user manipulations back to the signature web server (200). Here, for example, user text based manipulations (e.g. filling out an image of a form by apparently typing on the form in his or her web browser (204)) will be converted at the signature web server (200) into a text based image layer (212).

User manipulations of the document image (e.g. drawing on the image of the document in his or her web browser) will be transmitted over the internet from the user's web browser to the signature web server, and this data may be converted at the signature web server (200) into an image based annotation layer (214). In addition to applying new or previously uploaded signature images (or signature motions—i.e. drawing vector commands producing a signature), other user image manipulations may include standard electronic drawing commands including lines, rectangles, circles, ovals, arcs, curves, points, and brushstrokes of various widths, colors, and textures.

Some of these image based manipulations may be used to highlight or redact content from the original image (210). For example, a transparent yellow box could be imposed to emphasize some content. Alternatively an opaque black box may be imposed over objectionable or confidential content, thus obscuring this objectionable or confidential content from being seen by the recipient of the final outgoing document (218).

The signature web server can store a record of these user annotations as they sequentially arrive from the user. This allows the system to easily track changes, and easily undo the latest changes in order in case the user wishes to undo the latest changes.

The signature web server will electronically merge or combine the various image layers creating a composite document image (216) that can be sent to the user's web browser (204). Thus from the user's perspective, assuming a good internet connection, the user simply appears to be editing the document as if the user was using a standard locally based image manipulation program, rather than actually manipulating the appearance of the document (216) on the remote signature server (200).

Note that the actual original document image (210) need not be actually altered at any time during this process. This allows the user to completely undo all of his or her alterations, and also allows the original document image (210) to be reused multiple times for different purposes as desired.

Although the original document image (210) may be preserved unaltered, in some embodiments, it will be useful to give the remote user(s) (204), (206), (208) an ability to at least alter the brightness and contrast of the original document (210) through the use of controls located on the user's local web browsers. Additionally the original document may be cropped, rotated, sharpened, undergo color conversions (e.g. color to black and white grayscale, or color to black and white 1-bit images), color adjustments and other alterations as needed, in some cases producing a modified version of the original document image (211) that can be the basis for subsequent user annotation and signatures.

When the user is satisfied with the annotations and/or signatures, the user can inform the signature web server (200) to accept the final merged annotated document image (216), and to transmit the final annotated document image to a user specified recipient or destination (218).

These annotated document images (216), (218) can be transmitted to a designated recipient by many different means. For example, the original user (204) may wish to simply print his or her own copy by issuing a print command from the web browser running on the user's computerized device (204). Alternatively the user (204) may direct a different user (206), (208) to print from their device. Other methods include downloading a digital image file, such as a PDF file, from a web browser running on a computerized device (204), (206), (208), transmitting an analog or digital fax signal to a third party fax, fax server, or fax service such as eFax (202), transmitting an email to a third party email account, transmitting an email attachment to a third party email account (202), uploading to a third party server (203), physically mailing a hard copy to a third party, or storing a electronic copy of the annotated document image on the signature web server database (201).

An additional advantage of the virtual image layer approach is that in addition to the fact that the original document image can be stored in the signature web server in an unaltered form, the various annotation layers, such as the text annotation layer (or various elements of the text annotation layer) and the image annotation layer (or various elements of the image annotation layer) can also be stored on the signature web server. This allows frequently used annotation components, such as signature images, to be stored on the signature web server and be reused for different documents, as will be discussed later.

In some embodiments, different users (e.g. (204), (206), and (208)) may log onto the signature web server as individuals, and will not exchange documents between users. However in other embodiments, a user can also share a document (with annotations) with another user to support collaborative edits/annotations or sequential edits between users.

For example, consider a form that has to be filled out by multiple parties, such as an application form for an athletic scholarship. Here a student (204) may first fill out the personal details, a parent (206) may then complete another section authorizing participation, and then one or more coaches (208) may complete the application form with additional information before the form is finally submitted. The invention supports this type of collaborative edits/annotations between multiple users.

This collaborative edits/annotation feature is particularly useful for as in group practices, business, and the like, where multiple users (e.g. (204) and (206)) may sign up under a group account and all may have common access to the same set of documents.

Additionally, the signature web server may impose various levels of security and restricted access as desired. This can be done by standard techniques, such as by use of passwords, identification keys, biometric methods (e.g. fingerprint scanners) and so on.

Examples

Figure 3:
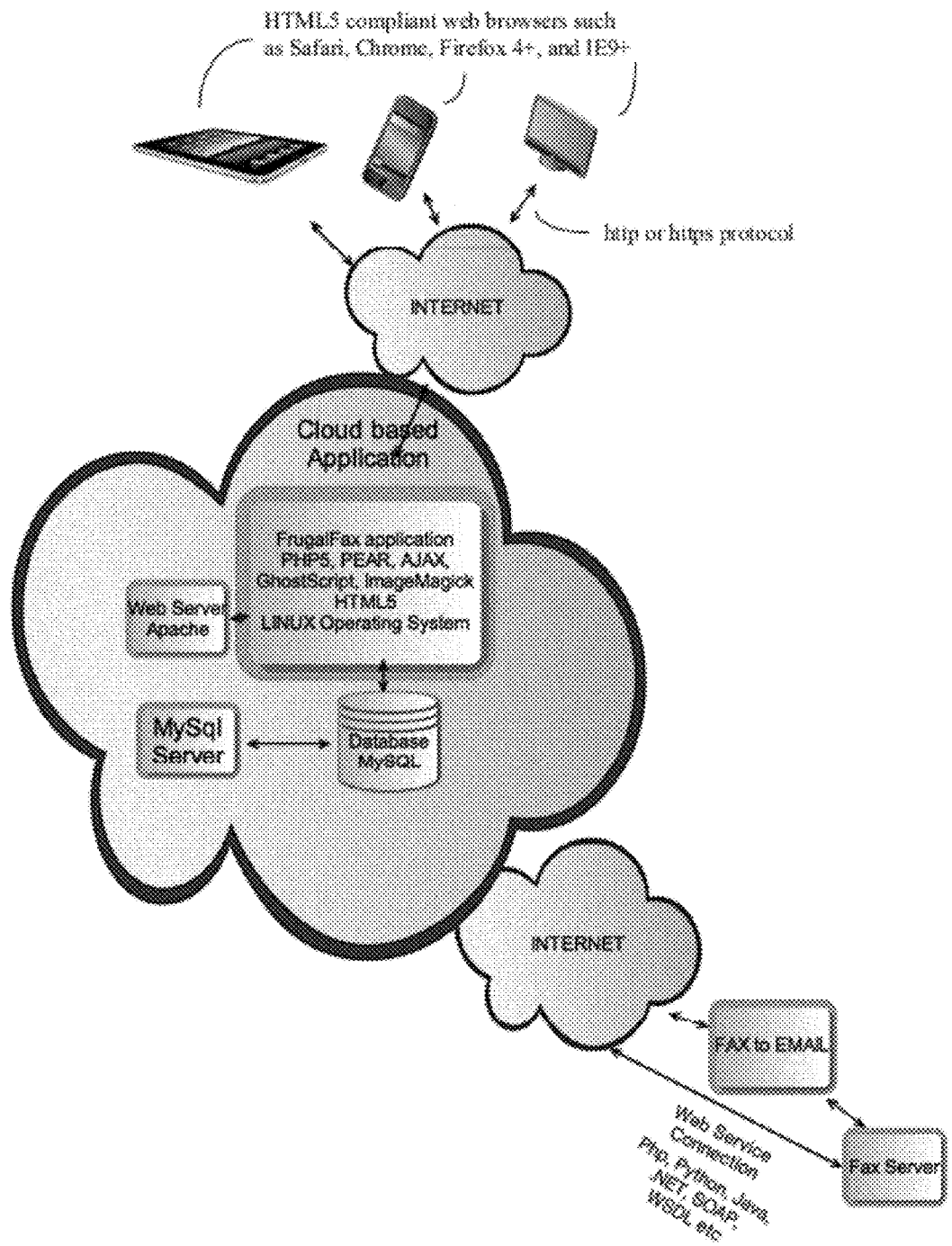
FIG. 3 shows a diagram showing some of the variety of different computerized devices with HTML-5 capable web browsers that can use the invention, as well as some details of the software used to implement one embodiment of the invention's methods on the signature web server.

A prototype version of the invention's method was implemented in software residing in computer memory running on one or more computer processors, typically x86 or ARM processors, running on one or more Internet connected web servers. This type of configuration is often referred to as a cloud based application. The prototype was designed to run under an Apache web server, and was encoded as a series of PHP5, PEAR, AJAX, Ghostscript, ImageMagick and HTML5 scripts, applications, and code. The web server in turn ran under the Linux operating system. The system stored and retrieved document images and data on a database under the control of MySQL database management software. A diagram of this configuration is shown in FIG. 3.

The prototype system was called "FrugalFax", and the invention will occasionally be referred to in the alternative in this disclosure as the "FrugalFax" method or system.

Figure 4:
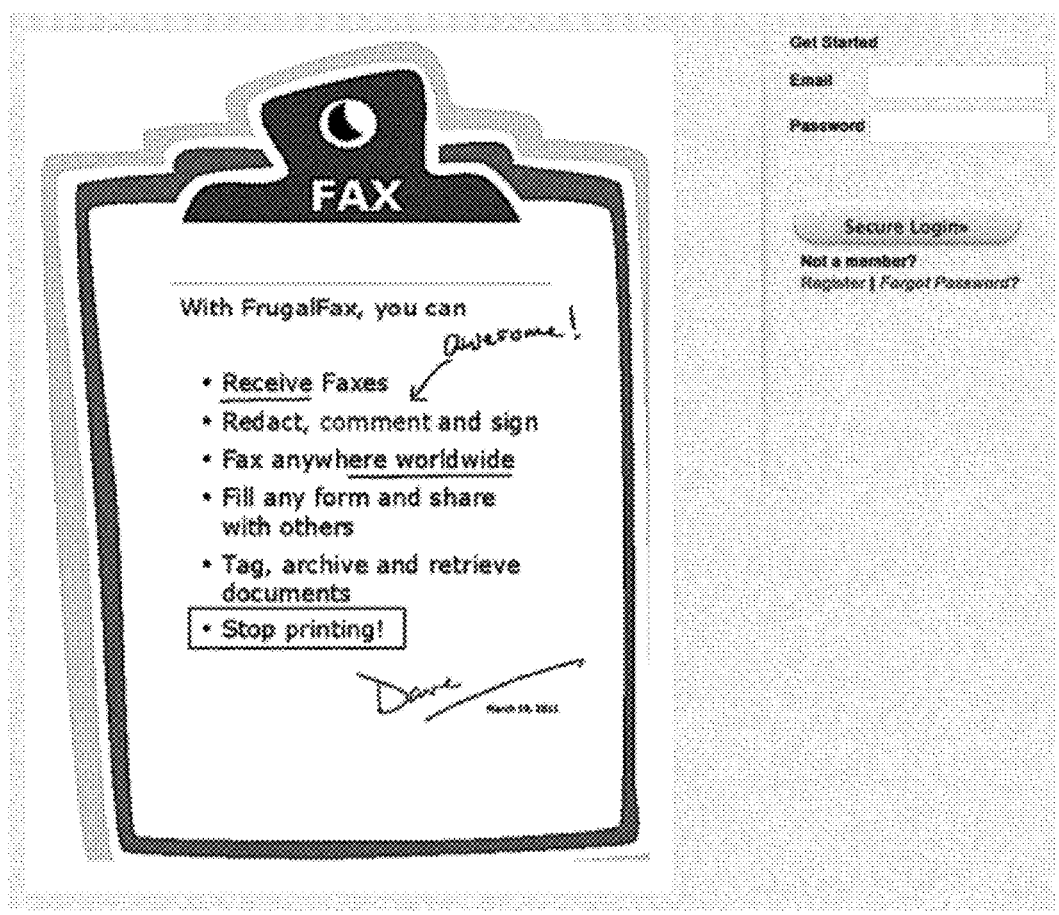
FIG. 4 shows an example of the invention's login screen.

Users typically interact with the FrugalFax system by logging on from their local web browsers running on their local computerized devices (204), (206), and (208). As is shown in FIG. 3, these local computerized devices can be various types of devices, including various devices such as computerized tablets (e.g. iPad or Android tablets), smart phones (e.g. iPhone or Android smart phones), desktop or laptop computers, and the like. An example of a typical type of login screen, which also discusses some of the invention's features, is shown in FIG. 4.

Figure 5:
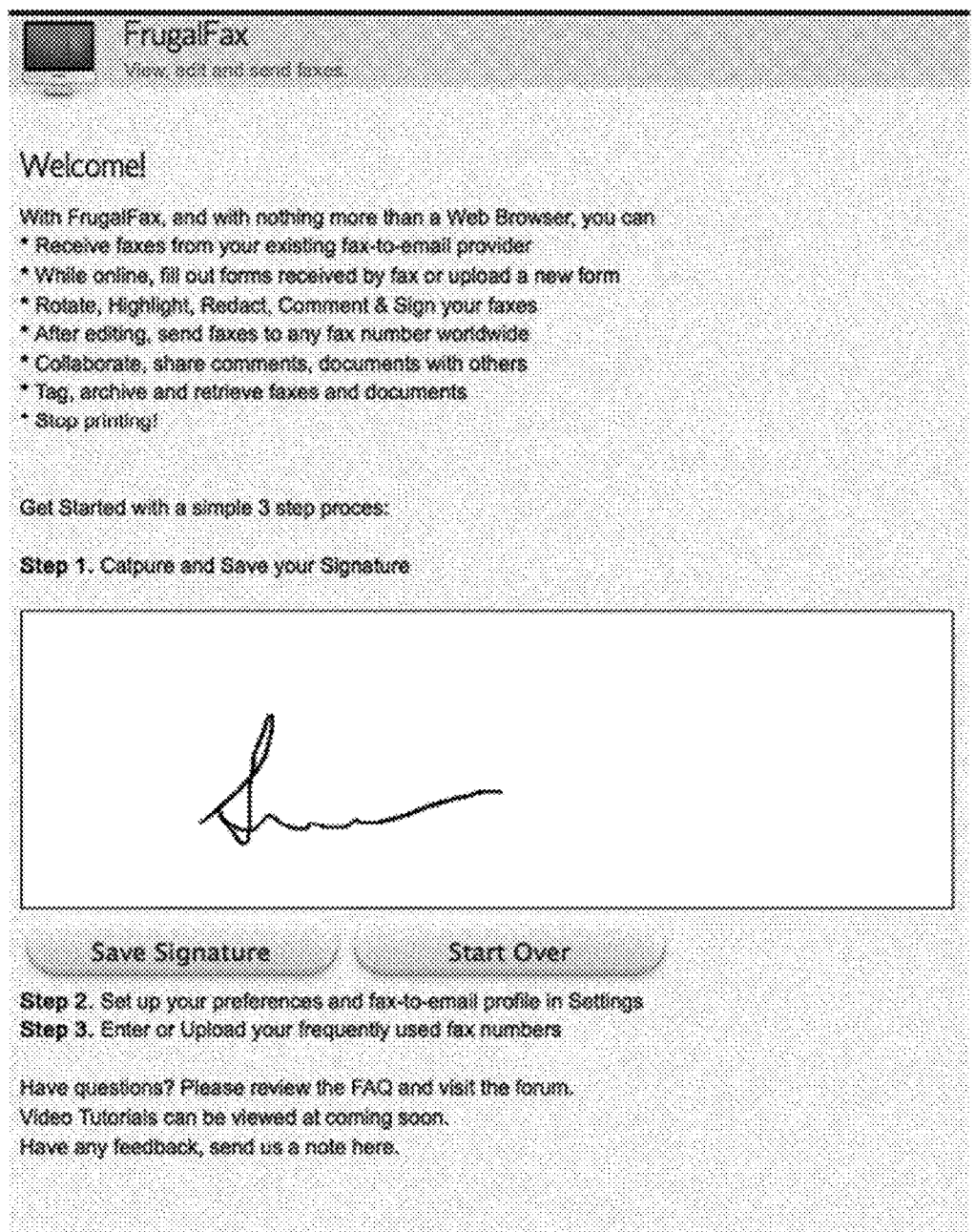
FIG. 5 shows an example of a signature capture process.

As previously discussed, one of the most commonly used document annotations is a signature. Although the user may sign each document on a one at a time basis by, for example, moving a mouse to draw a signature on the screen of the user's web browser, often it will be more convenient to upload and store a signature on the signature web server that can be used multiple times. To do this, the user can either upload an image of his or her signature, or alternatively the system can capture the user's signature by mouse movements, as is shown in FIG. 5. FIG. 5 also discusses some of the invention's other features.

Figure 6:
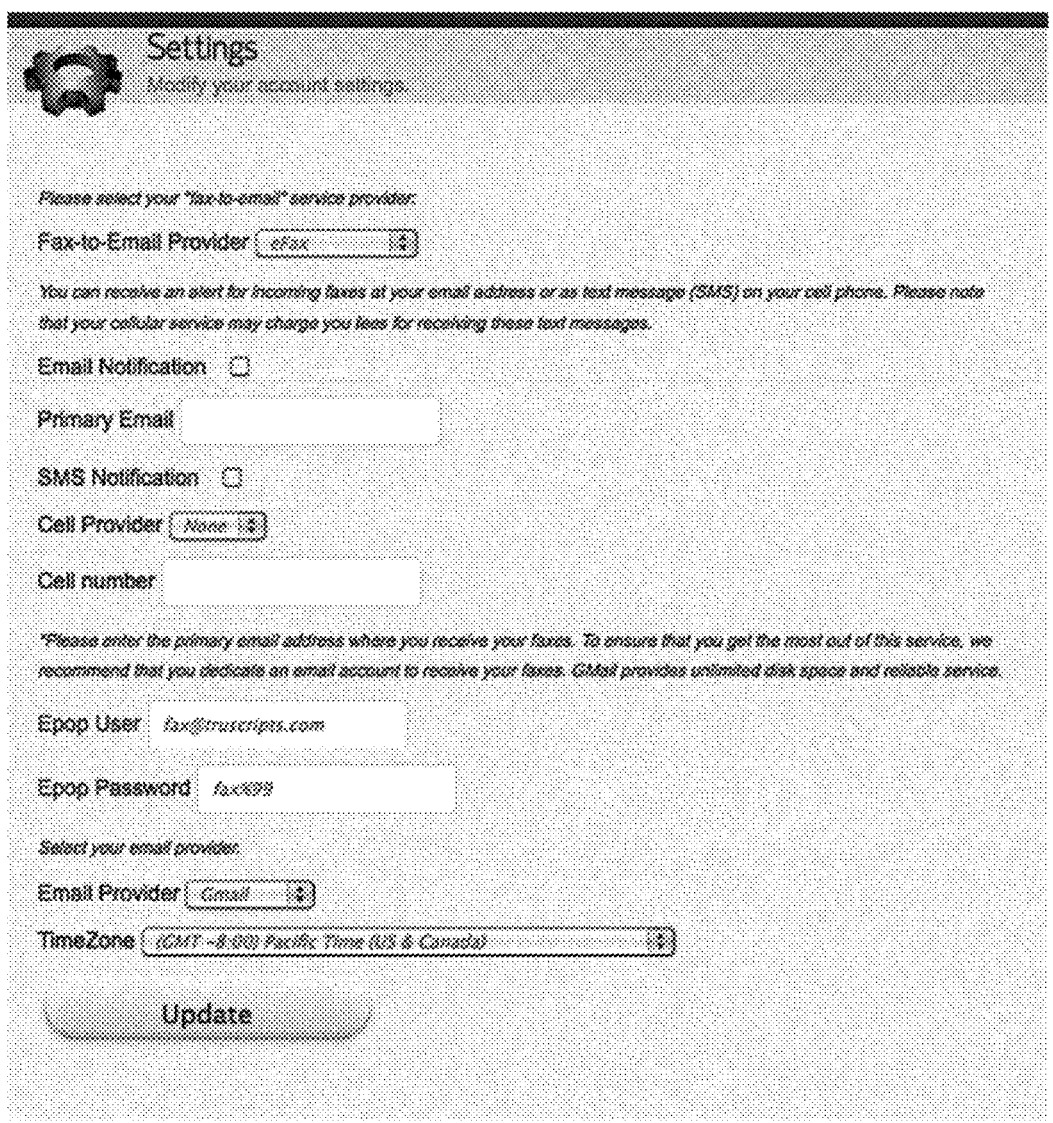
FIG. 6 shows an example of the invention's configuration screen.

Often this signature capture is done during an initial user configuration and customization process. This configuration and customization process will also often prompt the user to enter in his or her Fax-to-Email provider, email settings, and other data, as is shown in FIG. 6.

Once the system is configured, the user may then use his or her web browser (204), (206), (208) to direct the signature web server (200) to process a particular document. In this example, the user has directed the signature web server (200) to use a copy of a document that is residing on the signature web server's local database (201). As can be seen, the signature web server (200) sends HTML data and other data to the user's web browser to create a local user interface that somewhat resembles the user interface of a common software drawing program (700). In this example, the user is able to scroll or rotate through a view of multiple document pages (702) at the same time, and select one page (704) as the present focus of interest and manipulation. This page is shown magnified as (706).

The web browser based user interface can provide buttons to manipulate the brightness and contrast of the original document image (708). Other buttons (710) can be used to apply the signature image previously uploaded in FIG. 5. Still other buttons can do standard drawing commands (e.g. lines, squares, move annotation elements, zoom in, zoom out, add text, draw freeform, erase), and these are shown in (712). In this example, the user has used a drawing tool to make some scribbles on the document (714) simply to illustrate that such an annotation is possible. Keep in mind that these scribbles are actually being stored in the image annotation layer (214) in the remote signature web server (200), are being merged by signature web server (200) to create a combined annotated document image (216), which is then being shown on the user's local web browser (204).

Figure 8:
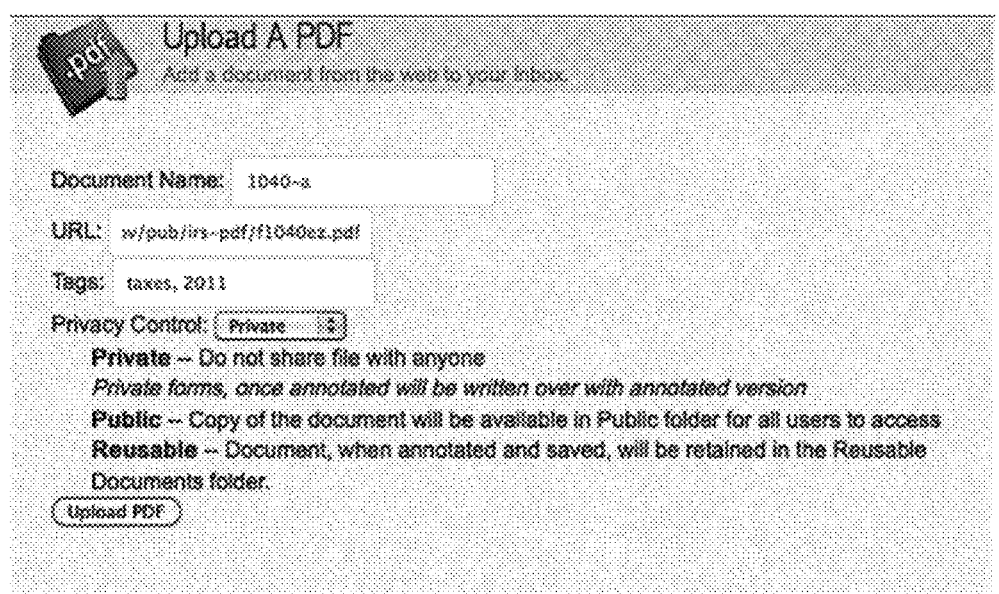
FIG. 8 shows how a remote user may instruct the signature web server to upload a document (here an IRS tax form) from a third party server (here an IRS server) to the invention's signature web server.

FIG. 8 shows how a remote user (204) may instruct the signature web server (200) to upload a document (here an IRS tax form) (210) from a third party server (203) to the invention's signature web server (200). In this example, the invention's ability to sign documents is being illustrated by uploading a PDF of an IRS tax 1040EZ form from an IRS web server (203). To do this, the user may simply enter in the URL of the document. The user may additionally tag the uploaded document with additional metadata, such as at least a brief descriptive tag, which will facilitate later storage, sorting, retrieval and database searches that may be conducted on various documents stored in signature web server database (201).

Figure 7:
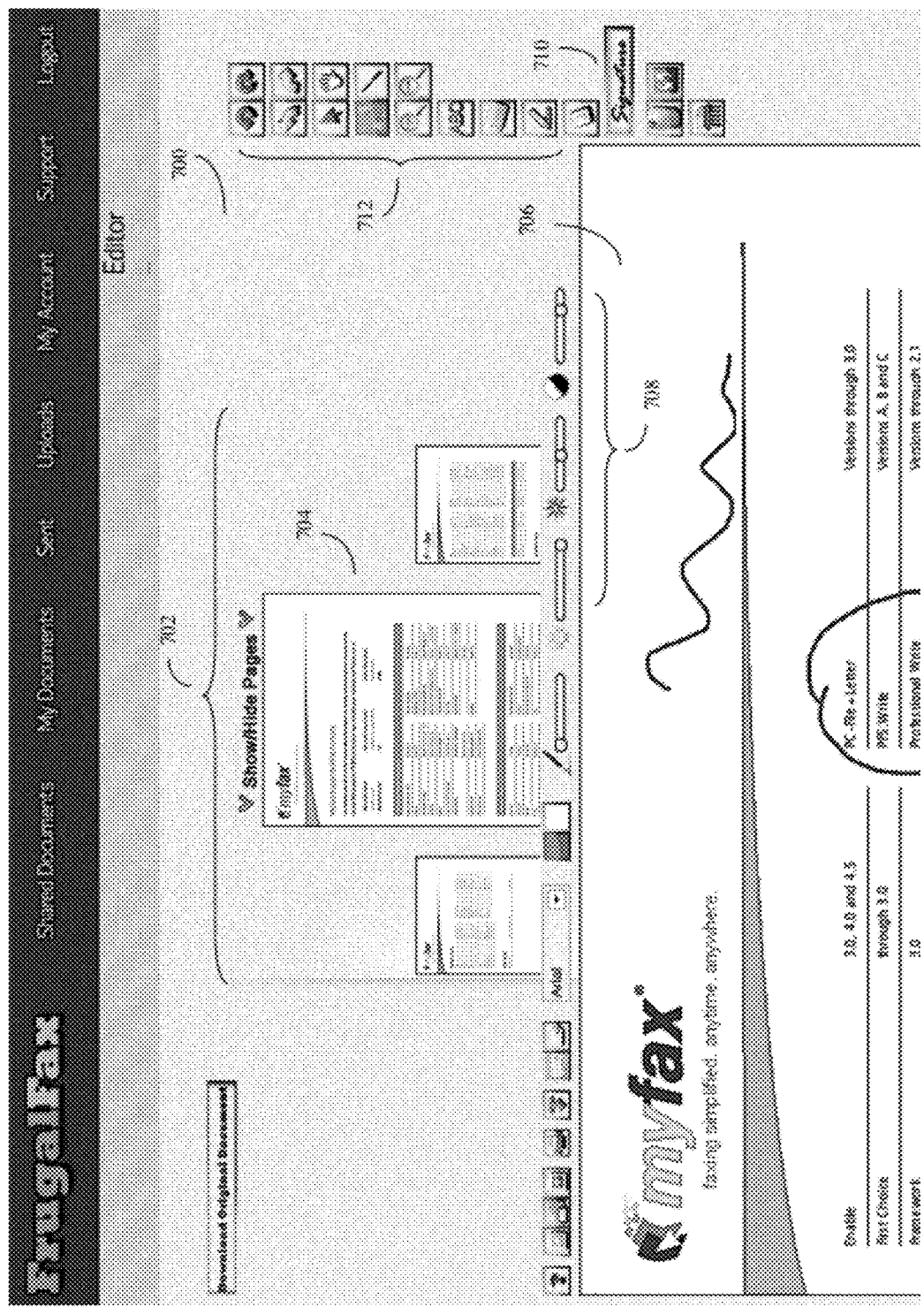
FIG. 7 shows an example of the web-browser based user interface for the invention, as seen by a remote user accessing the invention's signature web server over the Internet. Here the user can scroll or rotate through a number of document pages at once, and select a suitable page for signing and annotating. In this example, the user has used the invention's annotation capability to scribble on the document.
Figure 9:
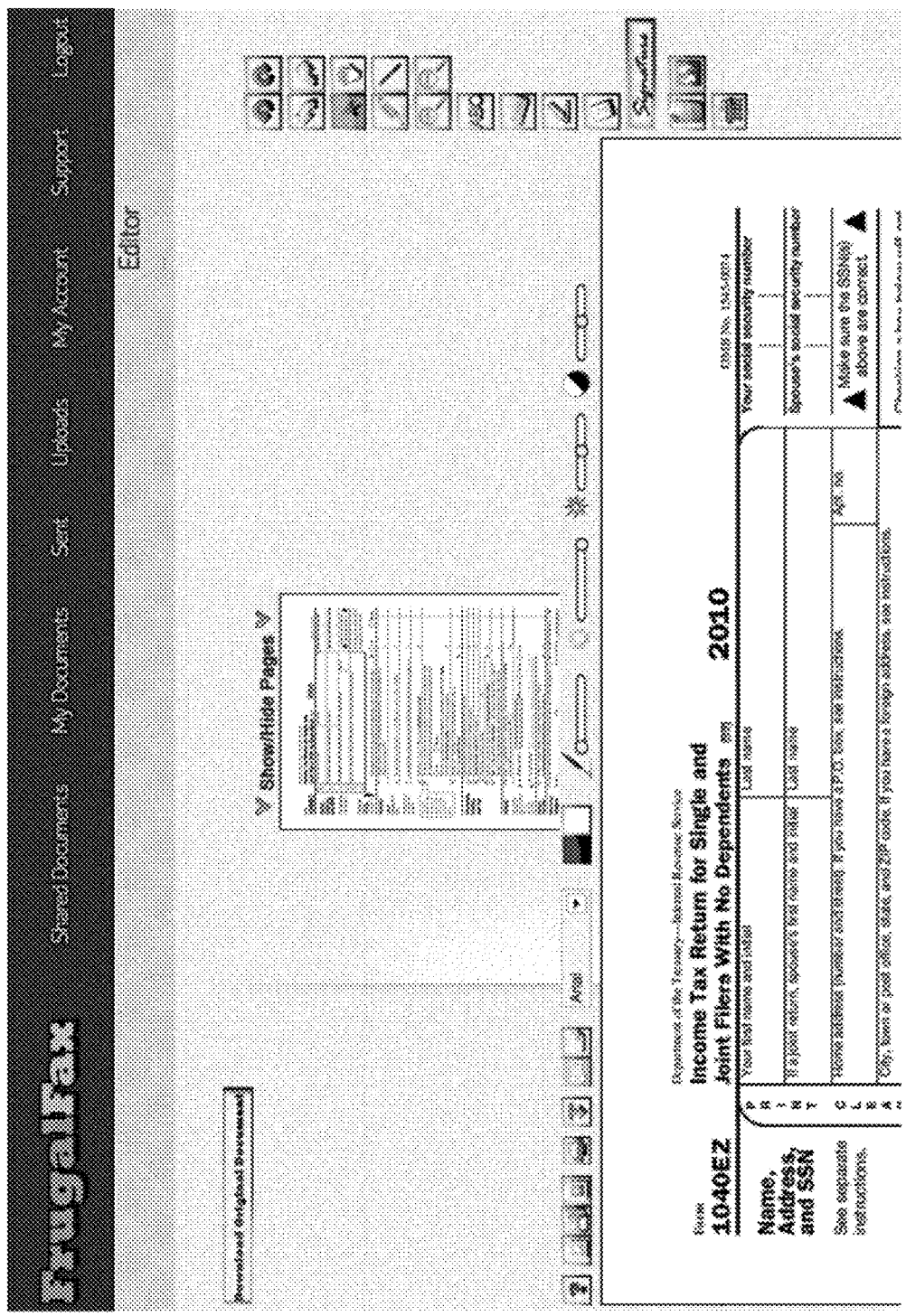
FIG. 9 shows a close up of the IRS tax form, which has now been loaded into the invention's remote signature web server, and now being shown in the web browser of the user's local computer or computerized device, along with various web browser based annotation tools.

FIG. 9 shows a close up of the IRS tax form, which has now been loaded into the invention's remote signature web server (200), and is now being shown in the web browser of the user's local computer or computerized device (204), along with various annotation tools, in a manner similar to that previously shown in FIG. 7.

Assume for this example that the user has used the system's text annotation function to previously add text to the otherwise simple and passive image of a 1040EZ document. That is, assume that this document is not otherwise capable of receiving text, and that the user has used the text tool to create text in a text annotation (212) layer on signature web server (200) that corresponds to the user's tax status (not shown). As a final step, the user now wishes to sign the document using a previously uploaded signature.

Figure 10:
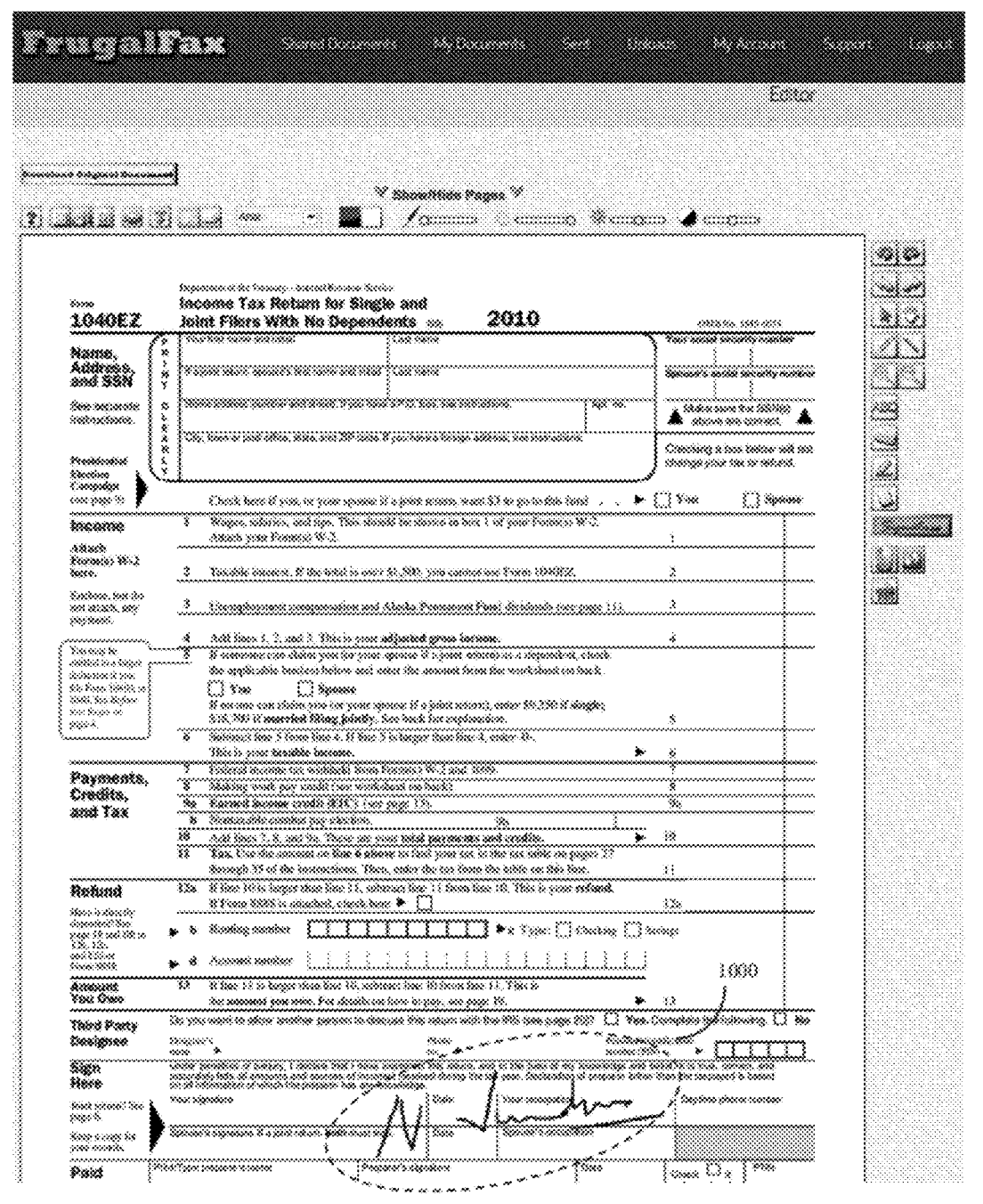

To do this, the user may first insert an image of the previously uploaded signature using the signature button (1000), and then manipulate the signature into the correct position using an appropriate move button and appropriate mouse movements (or touch screen movements). This is shown in FIG. 10. The user may also rotate and resize (i.e. enlarge, shrink) the signature image as needed to fit in the proper space.

Figure 11:
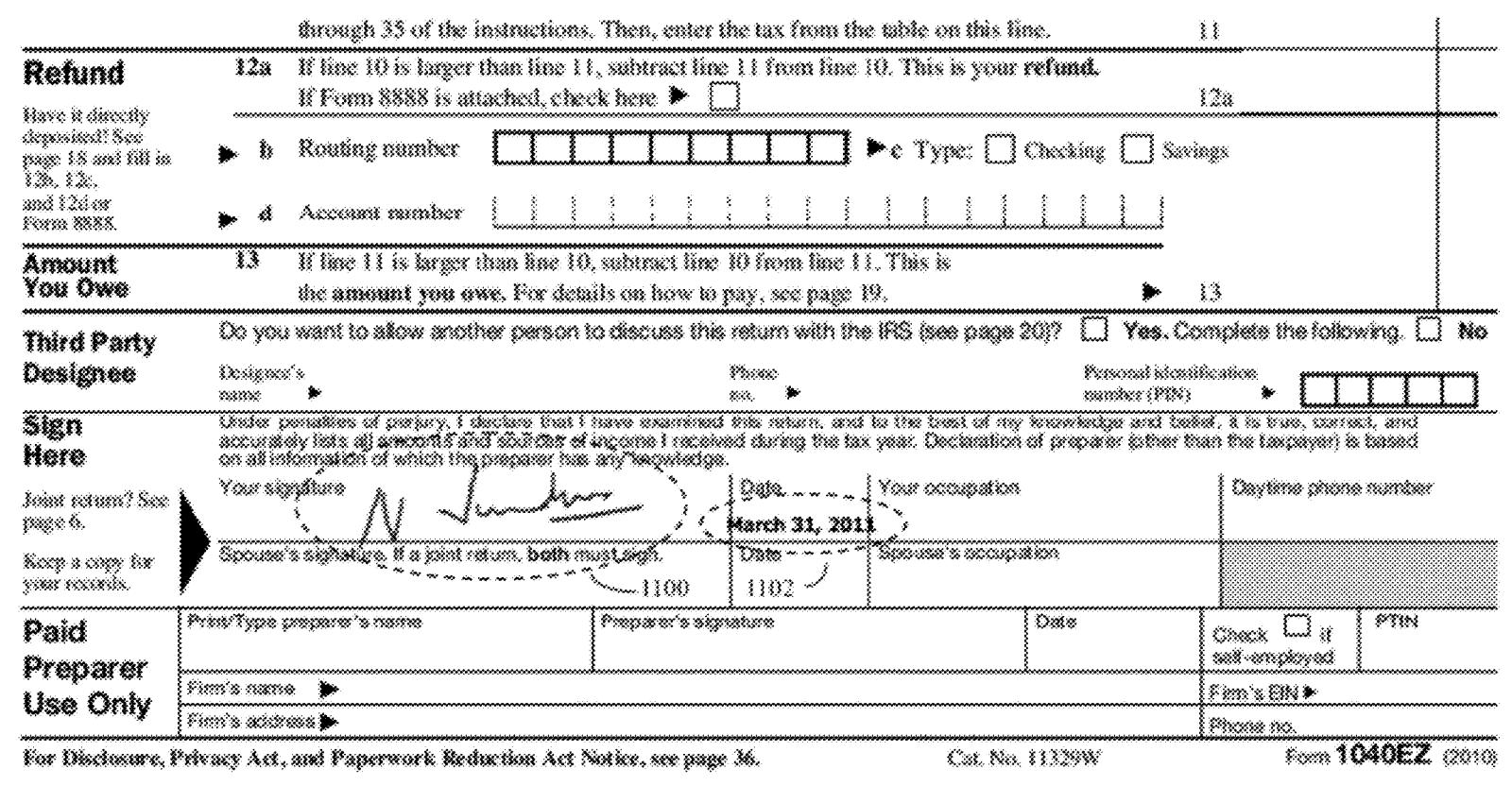

FIG. 11 shows the user signature now resized to the correct size, and positioned in the correct place in the IRS tax form (1100). Additionally, the user has annotated the IRS tax form with a date as well (1102) using some of the other web browser image manipulation buttons.

Software Flow Charts

Software flow charts showing one way to implement FrugalFax embodiment of the invention is shown in FIGS. 12-16.

Figure 12:
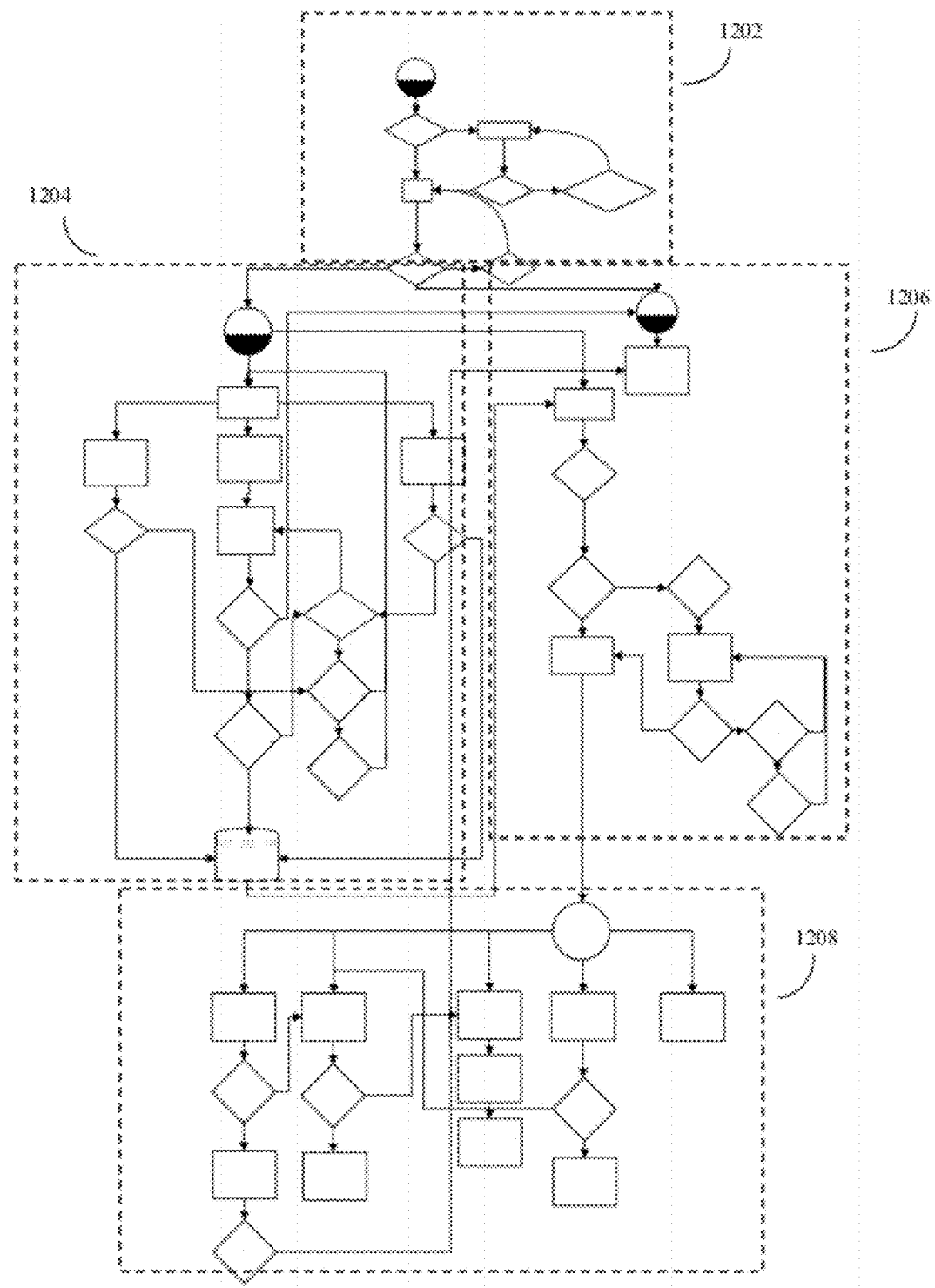
FIG. 12 shows an overview of a software flow chart showing one embodiment of the invention.

FIG. 12 shows a top level overview of a software flow chart showing one possible embodiment of the invention. Here flow chart section (1202) roughly corresponds to the FrugalFax embodiment's initial sign-on and registration steps, shown in more detail in FIG. 13. Section (1204) roughly corresponds to the FrugalFax's document importation steps shown in more detail in FIG. 14. Section (1206) roughly corresponds to the FrugalFax email communications management steps shown in more detail in FIG. 15. Section (1208) roughly corresponds to the FrugalFax embodiment document management and exportation steps, shown in more detail in FIG. 16.

Figure 13:
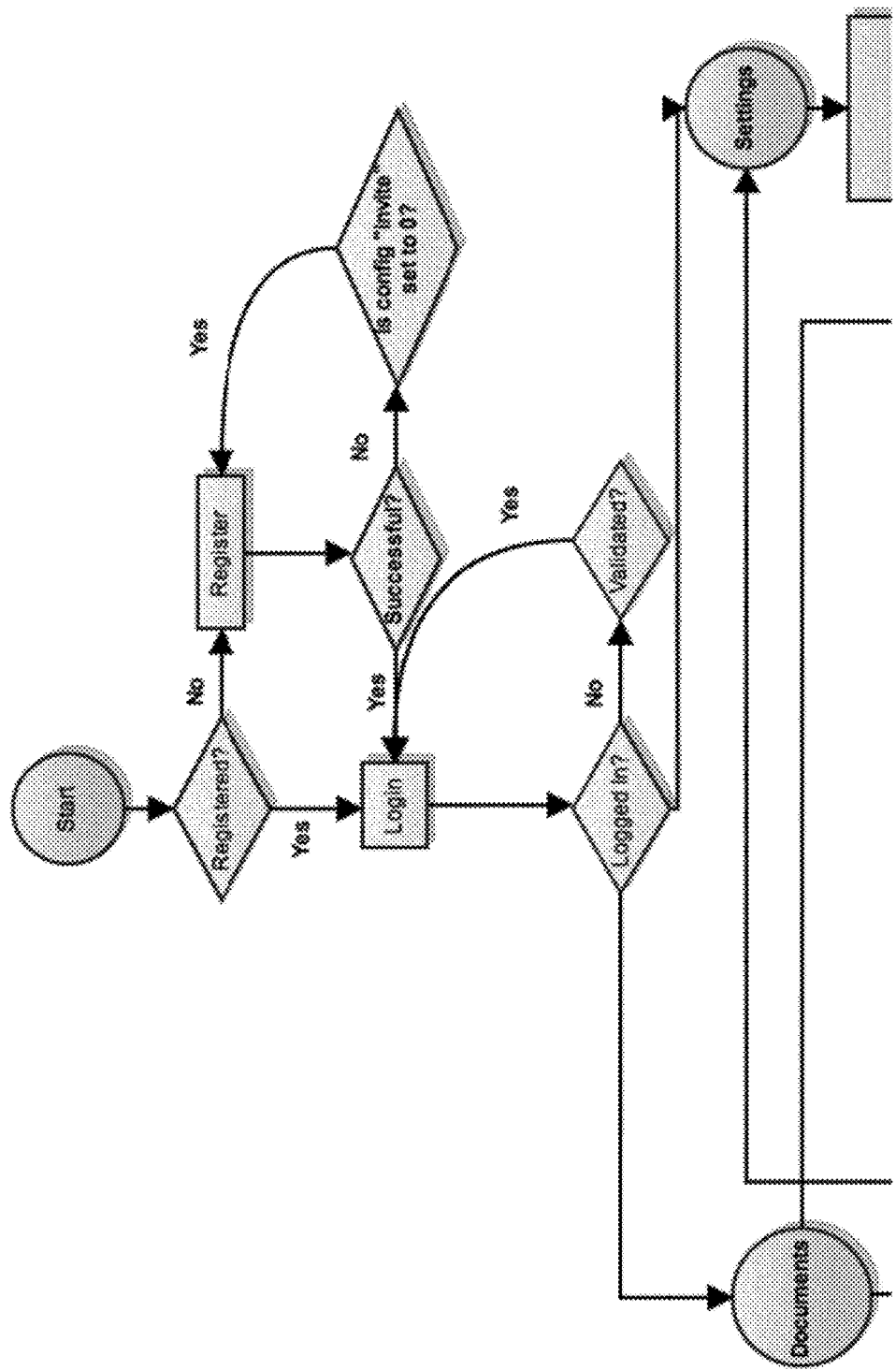
FIG. 13 shows a close-up of one embodiment of the invention's initial sign-on and registration steps.

FIG. 13 shows a close-up of one embodiment of the invention's initial sign-on and registration steps, previously shown as (1202)

Figure 14:
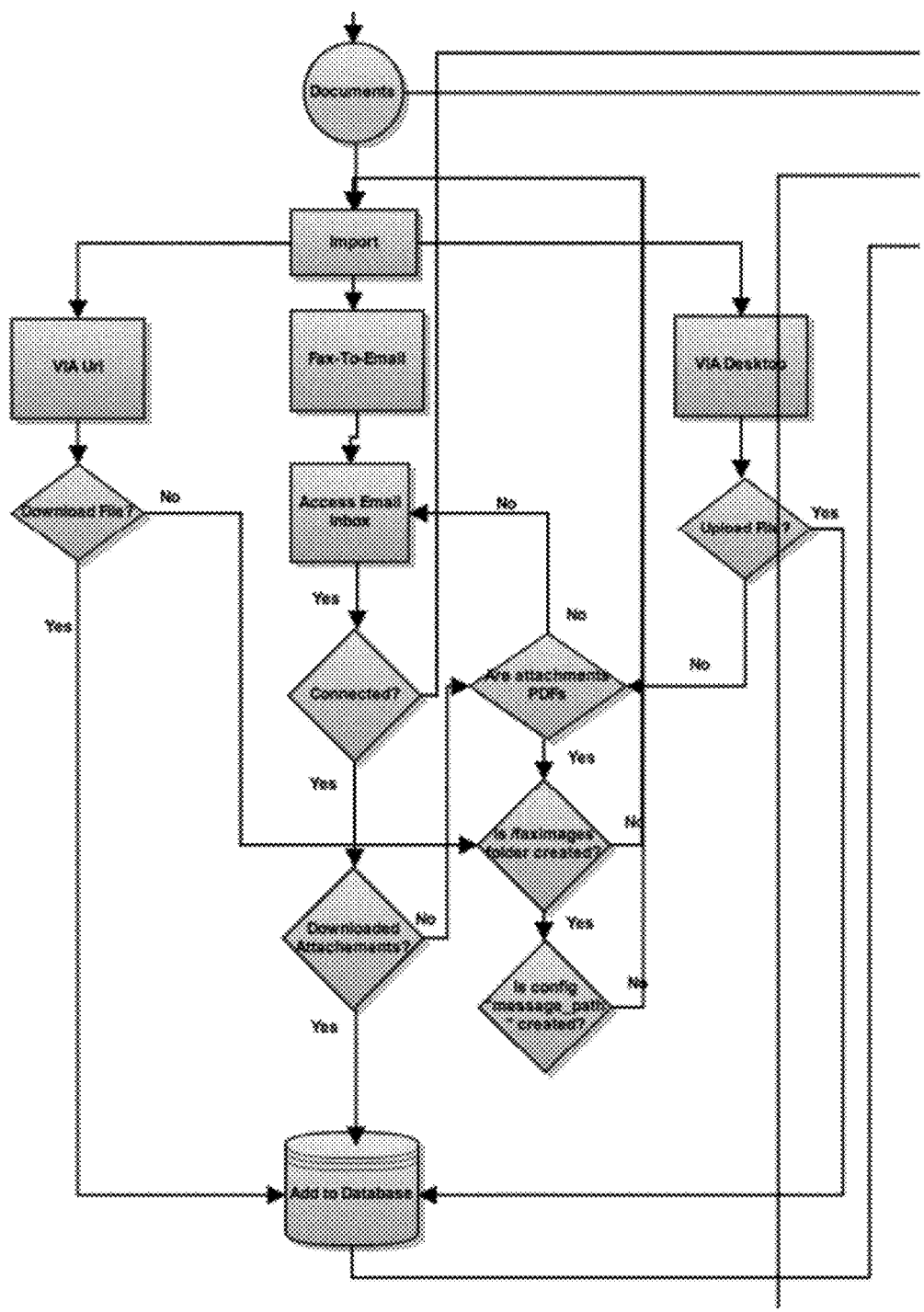
FIG. 14 shows a close-up of one embodiment of the inventions' document importation steps.

FIG. 14 shows a close-up of one embodiment of the inventions' document importation steps, previously shown as (1204).

Figure 15:
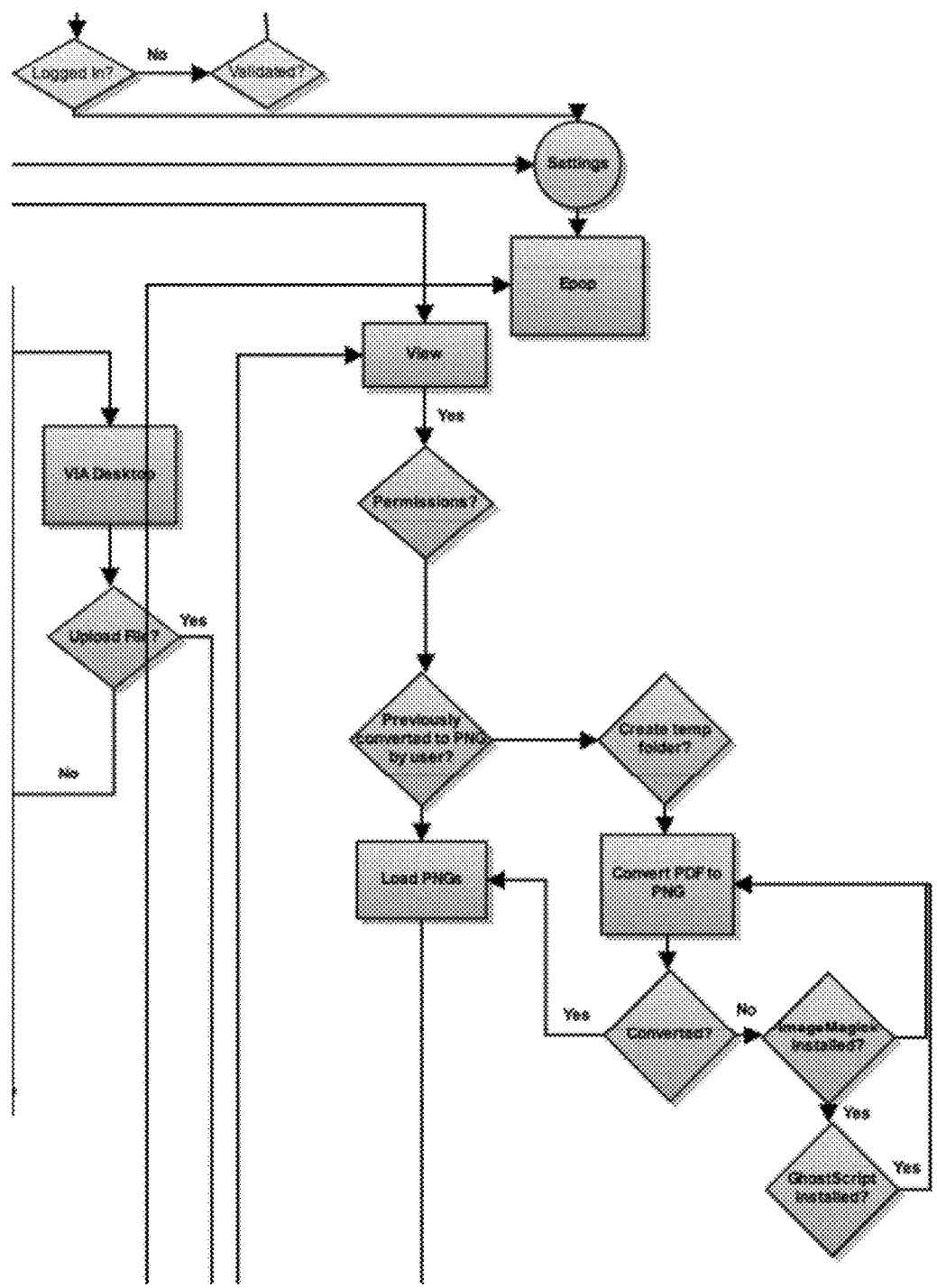
FIG. 15 shows a close-up of one embodiment of the invention's email communications management steps.

FIG. 15 shows a close-up of one embodiment of the invention's email communications management steps, previously shown as (1206).

Figure 16:
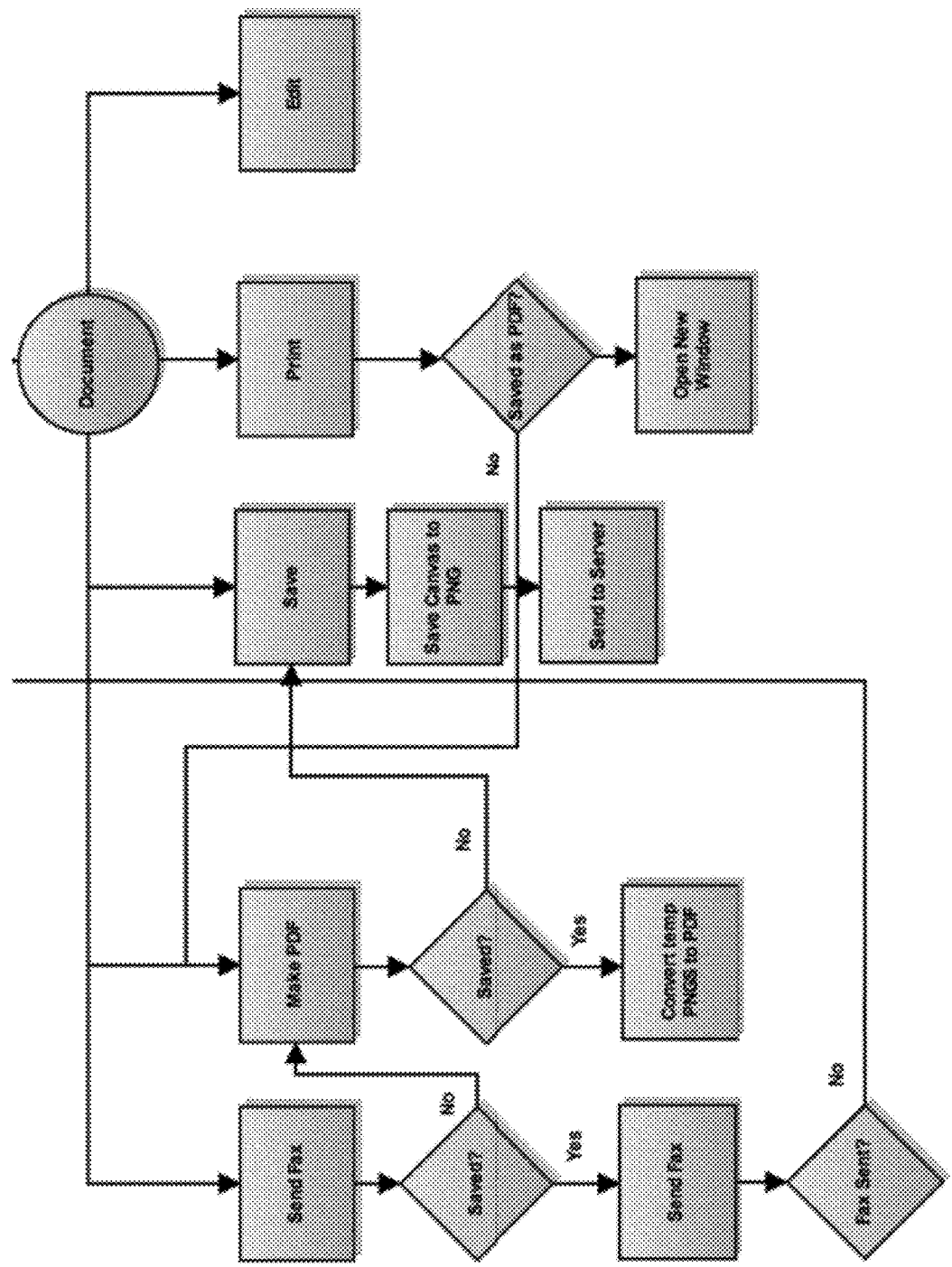
FIG. 16 shows a close-up of one embodiment of the invention's document management and exportation steps.

FIG. 16 shows a close-up of one embodiment of the invention's document management and exportation steps, previously shown as (1208).

Thus by using the invention, users can manage faxes and other documents using only a computerized device equipped with an Internet connection, and a web browser. Preferably this web browser should have some or all of the functionality of modern HTML5 compliant browsers (204), (206), and (208). Suitable web browsers include popular browsers such as Safari, Chrome, Firefox, Opera and IE9.

In some embodiments, a user who also subscribes to fax-to-email services such as eFax, MyFax, Smartfax, Faxaway and numerous others, may download and view their fax messages in a standard web browser by way of the invention's signature web server (200).

Using the invention, the user may perform functions such as rotating, viewing and printing incoming faxes. The user may also comment on a fax or annotate a fax within the web browser (204), (206), (208) using freehand drawing and text tools. The user may highlight sections of the fax with highlighting tools (e.g. coloring an area with a transparent yellow color), or alternatively redact sections (e.g. coloring an area with a non-transparent black or white color) as needed. The user may also stamp his or her signatures, date the document, or write custom messages anywhere on the document.

Additionally the user may upload and fill any PDF or other type document form or other without the need for extra software. The user may share his or her faxes and documents with anyone. The user may also reply by Fax or Email directly from the same unified environment of the user's web browser. The user may also tag and archive (save to database) faxes for future retrieval from any web browser. Finally, using the web browser and the internet, the user may also access faxes from any geographical location.

Additional Embodiments

Although in many embodiments, the computer memory storing the various documents will reside on a web server, and although the application software running on the computerized device will often be a web browser, such as an HTML 5 capable web browser, this need no always be the case. In alternative embodiments, the computer memory storing the various documents may reside on other types of computer memory, either local to the computerized device, or alternatively connected via a remote telecommunications connection such as the Internet or other electronic data connection.

Automatic sorting of incoming document faxes: Often various uses and businesses have a need to sort incoming faxes according to the identity of the original fax sender. For example, in a medical practice, some incoming faxes may come from a radiologist sender; other faxes may come from a cardiologist sender, and so on.

In some embodiments, the system may examine either the incoming fax telephone numbers, and/or the fax Called Subscriber Identification (CSID) text string data, and use the system processor to automatically compare this incoming fax data with a file (e.g. a user defined database table) or list of known fax sender identities. The system can then assign the incoming fax to this identity, and either store the incoming fax in an appropriate identity linked file or file folder in memory, or alternatively file this incoming fax in an appropriate identity linked entry in a database in memory.

Figure 17:
FIG. 17 shows how the system may use incoming fax telephone numbers or incoming Called Subscriber Identification (CSID) text string data to automatically identify the source of a fax and to store faxes from that source in the appropriate folder or database.

An example of the user interface display from such an automatic fax filing system is shown in FIG. 17. Here a list of incoming faxes is shown in (1700), and a previously established list of folders, each representing a different sender, is shown in (1702).

Splitting larger fax files into smaller messages: The medical practice example previously discussed in FIG. 17 is also serves as a good example to illustrate a second problem as well. Often fax senders send multiple unrelated documents as a single fax file. For example, it is common for a medical practice to refer multiple patients to a particular radiologist or cardiologist, and these particular radiologists and cardiologists in turn may often decide to send reports back on multiple patients as a single large fax transmission or file.

As a result, often it is also useful to design the system so that the different portions of the larger incoming fax file, which correspond to different fax reports from the different patients, be easily split into smaller files which can then be filed or stored in a database separately.

Figure 18:
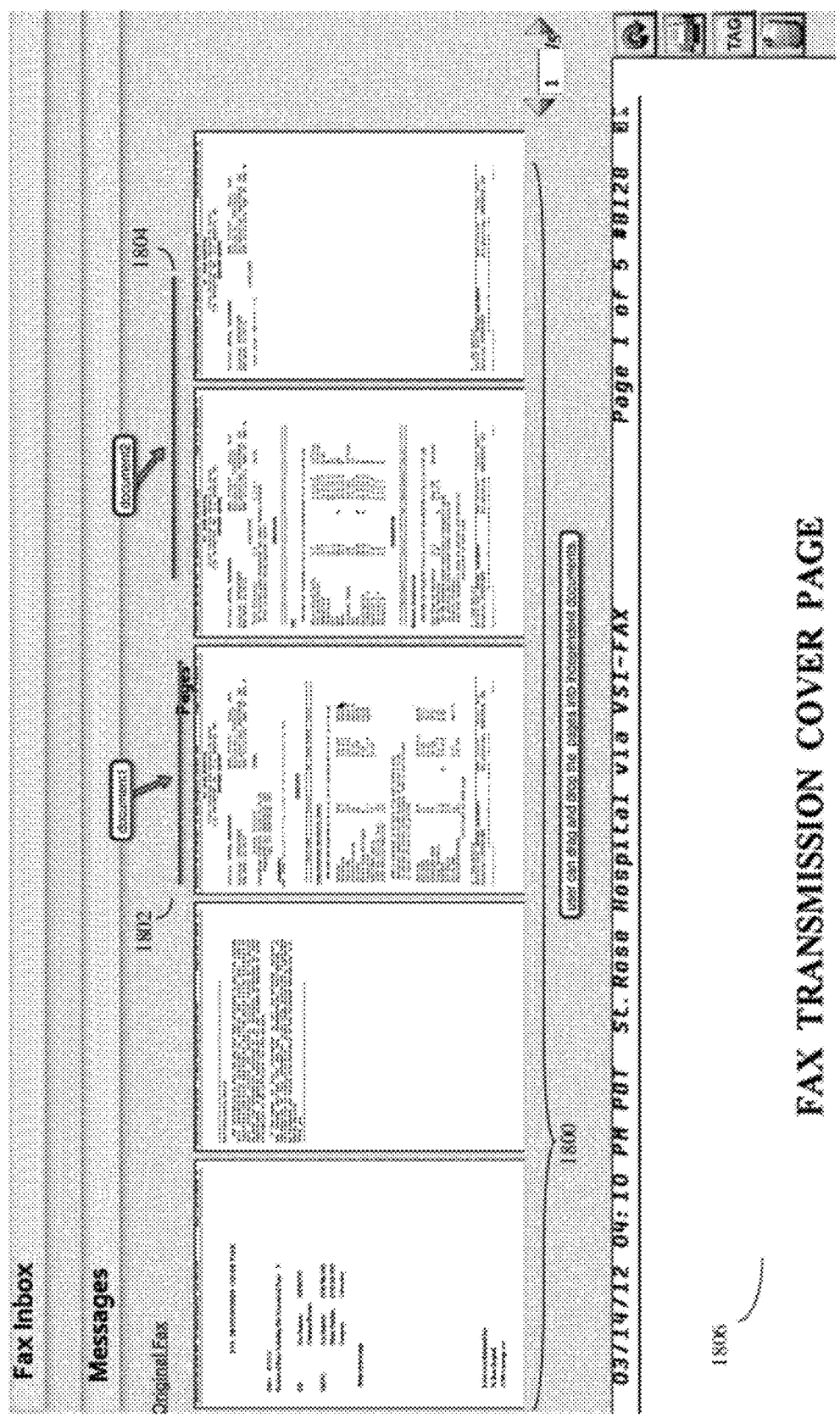
FIG. 18 shows an example of how a larger incoming fax file, which may contain a plurality of different messages, may be split into smaller files (often on a per message basis) and filed accordingly.

FIG. 18 shows an example of how a larger incoming fax file, which may contain a plurality of different messages, may be split into smaller files (often on a per message basis) and filed accordingly. In (1800), a larger original fax is displayed on system's graphical user interface, and the user can then view the pages, and drag and drop the pages into independent documents. Here for example, (1802) is one independent document; while (1804) is a different independent document. The first page of this large fax is shown in larger size as (1806).

Touch sensitive tablet embodiments: In some embodiments, the system may be implemented on a tablet computer (exemplified by the popular Apple Computer iPad), or on a Smartphone. Although such devices may use a web browser, such as an HTML 5 capable web browser previously discussed to implement the method, other programs may also be used. In particular, it may be useful to create tablet or Smartphone specialized "app" versions of the software that, although still HTML 5 capable, will be customized to better make use of the unique aspects of tablet computer graphical user interface, such as their multitouch capability, and general use of fewer separate buttons and other user controls.

One such embodiment, called the "SecureSign" application (app), was submitted by applicant and published on the Apple iTunes store on Apr. 4, 2012. As applicant described this system:

"Ever find the need to sign a document and forward to someone else? SecureSign allows access to PDF attachments received by email for annotation and signature. There is no limit to the number of documents that you can sign with this App. You can create custom stamps for frequently used phrases and for signatures."

This tablet embodiment often operates by receiving documents as email attachments, or from various web services. Once signed or otherwise annotated by the tablet computer user, the annotated document may then be transmitted to its intended recipient by various means, such as email attachments, fax, or to a web service adapter.

Figure 19:
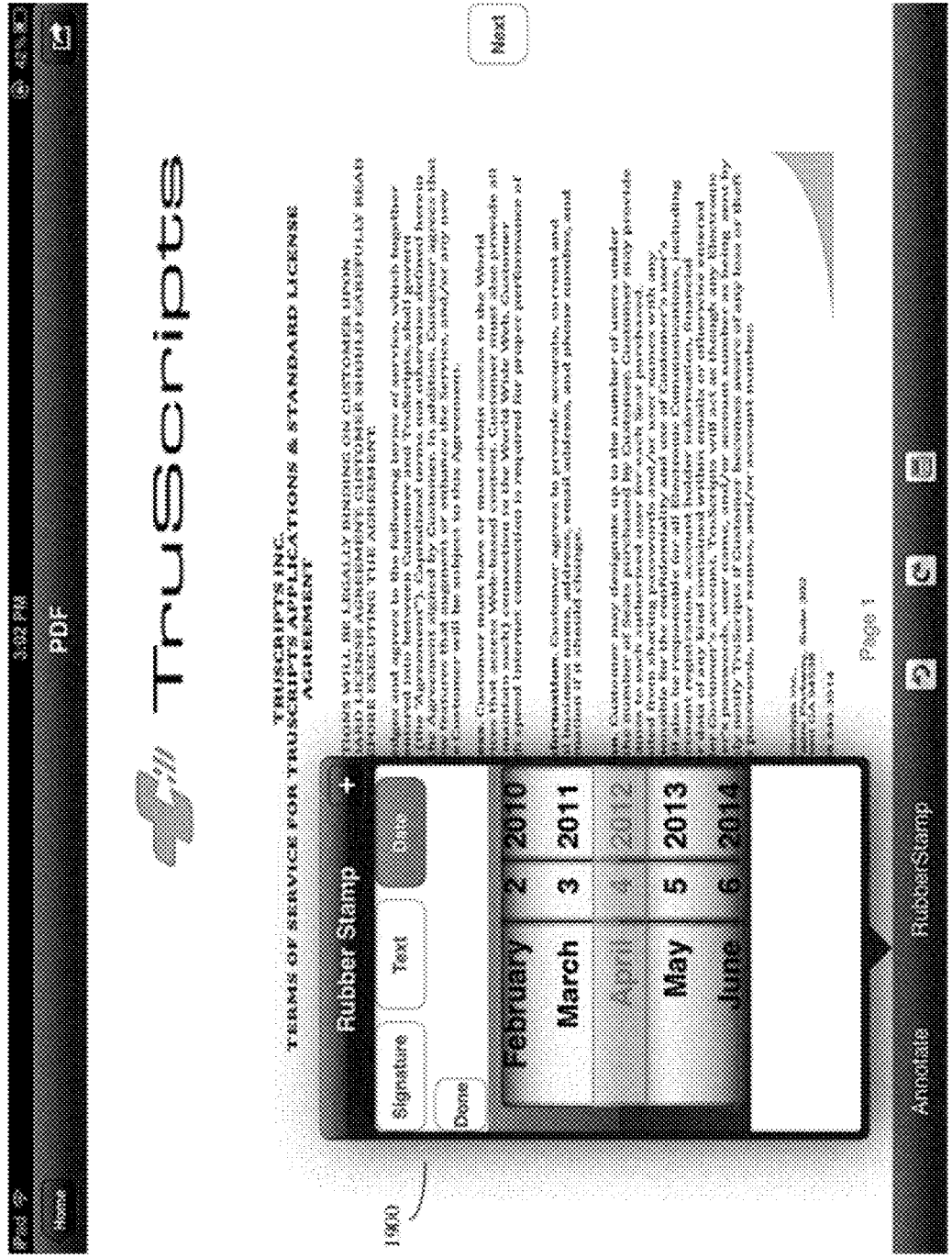
FIG. 19 shows an interface from a tablet (iPad) version of the system. Here use with tablet computers can be facilitated by the use of a "rubber stamp" interface, optimized for touch screen systems, that allows the user to define various electronic "rubber stamps" for dates, signatures, text, or other functions and then use the touch interface to apply the appropriate "rubber stamp" over the representation of the document on the screen. Here the user is setting the date for a date rubber stamp.

FIG. 19 shows a graphical user interface display screen from this tablet (iPad) version of the system. Here use with tablet computers can be facilitated by the use of a "rubber stamp" interface. In essence this rubber stamp system operates by first allowing the user to define a data structure, here called the "rubber stamp" that defines graphical content that the user wishes to electronically place (e.g. stamp) onto the document. The rubber stamp data structure can be a graphic (e.g. a signature), or text (often with a defined font), or a data field (such as a date field). Thus the position of the data structure, relative to the underlying document, can be manipulated by the user. The user can also control other variables, such as the size of the ultimate imprinted text or graphic, angle of the text or graphic, and so on, merely by touching the "rubber stamp" and moving it about the touch sensitive screen. In a preferred embodiment, the "rubber stamp" will be designed to respond to multitouch gestures from two or more fingers, and thus for example expand, contract, or rotate as the user's fingers that touch the sides of the "rubber stamp" move accordingly.

Thus the system allows the user to define various electronic "rubber stamps" for dates, signatures, text, or other functions and then use the touch interface to apply the appropriate "rubber stamp" over the representation of the document on the screen.

Figure 20:
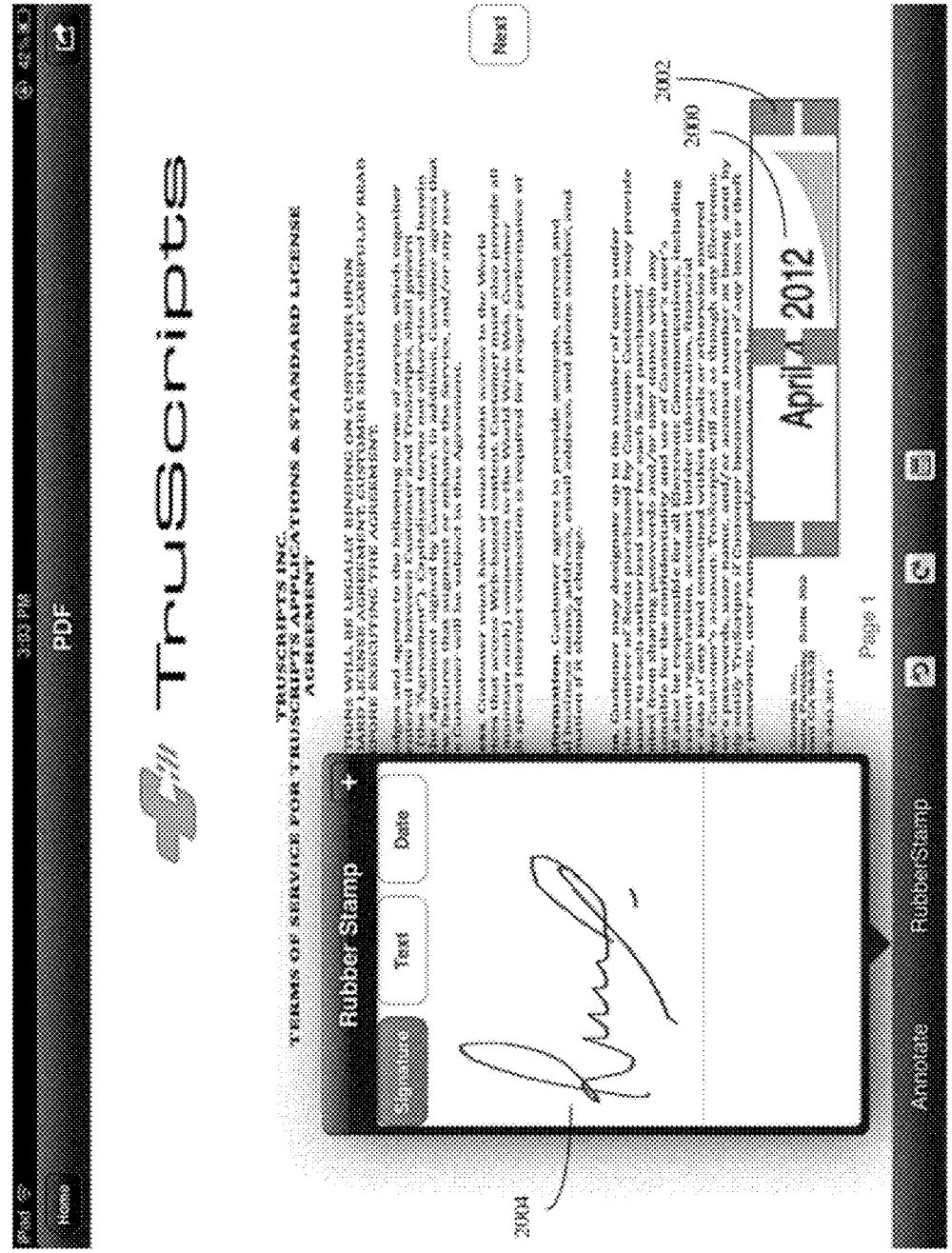
FIG. 20 is another view of the tablet interface, showing how after the user has manipulated the "date" rubber stamp to the appropriate location on the document, the user has then opened the "signature" rubber stamp.

In FIG. 19 (1900), the user is setting the date for a date rubber stamp, which will then be applied to the document in FIG. 20.

FIG. 20 is another view of the tablet interface. Here two things are happening. The first is that the user has now manipulated the "date" rubber stamp, previously defined in FIG. 19, to the appropriate location on the document (2000) and has also defined the size of the date text by adjusting the edges of the "stamp" (2002). Additionally, the user has also opened an alternative "signature" rubber stamp (2004), and is either entering the signature, or reviewing a previously entered signature, prior to applying the signature to the document, which is shown in FIG. 21.

Figure 21:
FIG. 21 is another view of the tablet interface, showing the user manipulating the "signature" rubber stamp to the appropriate location and size on the document.

FIG. 21 is another view of the tablet interface, showing the user manipulating the "signature" rubber stamp (2100) to the appropriate location and size on the document. Note that the date stamp (2102) previously applied in FIG. 20 is now finished and in place.

FIG. 22 is another view of the tablet interface, showing the final signed and dated document.

The invention claimed is:

1. A method of annotating web server stored document images using a web browser, said method comprising;
  loading said document images on said signature web server, creating an image layer, and transmitting an HTML copy of said image layer to a computerized device running a web browser;
  viewing said document image layer within said web browser;
using said web browser to annotate said images, transmitting an HTML copy of said annotations to said signature web server;
  in which said at least one annotation layer comprises a text annotation layer and an image annotation layer, and in which each annotation layer and said image layer may be independently saved in a database on said signature web server;
  in which the HTML has HTML 5 canvas functionality, and further using said HTML5 canvas capability to manipulate said image layers;
  using said annotations at said signature web server to create at least one annotation layer, and combining said at least one annotation layer with said document layer producing an annotated document image;
  transmitting an HTML copy of said annotated document image to said web browser; using said web browser to accept said annotated document image and designate a recipient for said annotated document image;
  transmitting said annotated document image to said recipient; and
wherein transmitting said annotated document image is done by merging said image layer, said text annotation layer, and said image annotation layer, and creating a PDF file of said merged layers, and transmitting said merged layers as said annotated document image.

2. The method of claim 1, further uploading a signature image or signature series of motions from said web browser to said signature server for future use for annotating document images with a signature.

3. The method of claim 1, wherein said annotations comprise standard electronic drawing commands including lines, rectangles, circles, ovals, arcs, curves, points, and brushstrokes of various widths, colors, and textures.

4. The method of claim 1, further loading said document images on said signature web server by direct analog fax reception, email using standard POP or IMAP protocols, email attachment, uploading from a different web server, uploading from said user's web browser, use of a file already stored on said signature web server, and uploading from a third party email service by use of third party service API.

5. The method of claim 1, further transmitting said annotated document images to said recipient by printing from said web browser running on said computerized device, downloading from said web browser running on said computerized device, transmitting an analog fax signal to a third party fax, transmitting an email to a third party email account, transmitting an email attachment to a third party email account, uploading to a third party server, mailing a copy to a third party, or storing a copy of said annotated document image on said signature server.

6. The method of claim 1, further storing the sequence of said web browser annotations in said signature server, and allowing said user to sequentially undo said web browser annotations and see the resulting partially undone annotated document image in said web browser.

7. The method of claim 1, further using said web browser to adjust at least the brightness or contrast of said document images on said signature server, and viewing the results of said adjustments on said web browser.

8. The method of claim 1, further using said web browser to adjust the position or angle of said annotations on said signature server, and viewing the results of said adjustments on said web browser.

9. A method of annotating computer memory stored document images using an HTML 5 capable software program, said method comprising;
  loading said document images on said signature computer memory, creating an image layer, and transmitting an HTML copy of said image layer to a computerized device running an HTML 5 capable software program;
  viewing said document image layer within the graphical user interface of said HTML 5 capable software program;
  using said HTML 5 capable software program to annotate said images, transmitting an HTML copy of said annotations to said signature computer memory;
  in which said at least one annotation layer comprises a text annotation layer and an image annotation layer, and in which each annotation layer and said image layer may be independently saved in a database on said signature computer memory;
  in which the HTML 5 capable software program has HTML 5 canvas functionality, and further using said HTML5 canvas capability to manipulate said image layers;
  using said annotations at said signature computer memory to create at least one annotation layer, and combining said at least one annotation layer with said document layer producing an annotated document image;

transmitting an HTML copy of said annotated document image to said HTML 5 capable software program;
using said HTML 5 capable software program to accept said annotated document image and designate a recipient for said annotated document image;
transmitting said annotated document image to said recipient; and
wherein transmitting said annotated document image is done by merging said image layer, said text annotation layer, and said image annotation layer, and creating a PDF file of said merged layers, and transmitting said merged layers as said annotated document image.

10. The method of claim 9, wherein said computerized device is a tablet computer equipped with a multitouch graphical user interface.

11. The method of claim 9, wherein said web server stored document images were obtained from fax transmissions sent by at least one sender with a sender identity;
Said fax transmissions have an associated sender telephone number or CSID text string;
Further using said sender telephone number or CSID text string, in association with a file associating said telephone number or CSID text string with said sender identity to automatically store said fax transmissions in files or a database in a manner that links said fax transmissions with said sender identity.

12. The method of claim 11, further providing a user interface to divide said fax transmission into one or more separate fax documents.

* * * * *